(12) United States Patent
Deng et al.

(10) Patent No.: US 11,760,655 B2
(45) Date of Patent: Sep. 19, 2023

(54) METHOD FOR RECYCLING IRON AND ALUMINUM IN NICKEL-COBALT-MANGANESE SOLUTION

(71) Applicants: HUNAN BRUNP RECYCLING TECHNOLOGY CO., LTD., Changsha (CN); GUANGDONG BRUNP RECYCLING TECHNOLOGY CO., LTD., Foshan (CN); HUNAN BRUNP VEHICLES RECYCLING CO., LTD., Changsha (CN)

(72) Inventors: Haozhen Deng, Changsha (CN); Zhixin Kan, Changsha (CN); Ruokui Chen, Changsha (CN); Dingshan Ruan, Changsha (CN); Fang He, Changsha (CN); Changdong Li, Changsha (CN)

(73) Assignees: HUNAN BRUNP RECYCLING TECHNOLOGY CO., LTD., Changsha (CN); GUANGDONG BRUNP RECYCLING TECHNOLOGY CO., LTD., Foshan (CN); HUNAN BRUNP VEHICLES RECYCLING CO., LTD., Changsha (CN)

( * ) Notice: Subject to any disclaimer, the term of this patent is extended or adjusted under 35 U.S.C. 154(b) by 0 days.

(21) Appl. No.: 18/043,027

(22) PCT Filed: Aug. 3, 2021

(86) PCT No.: PCT/CN2021/110302
§ 371 (c)(1),
(2) Date: Feb. 25, 2023

(87) PCT Pub. No.: WO2022/042228
PCT Pub. Date: Mar. 3, 2022

(65) Prior Publication Data
US 2023/0227325 A1 Jul. 20, 2023

(30) Foreign Application Priority Data

Aug. 25, 2020 (CN) .......................... 202010861358.9

(51) Int. Cl.
*C01G 49/00* (2006.01)
*C01G 49/02* (2006.01)
(Continued)

(52) U.S. Cl.
CPC ................ *C01G 49/02* (2013.01); *C01F 7/34* (2013.01); *C22B 7/007* (2013.01); *C22B 21/0023* (2013.01); *H01M 10/54* (2013.01)

(58) Field of Classification Search
CPC ..... C01G 49/02; C22B 7/007; C22B 21/0023; H01M 10/54
(Continued)

(56) References Cited

FOREIGN PATENT DOCUMENTS

| CN | 101850998 A | 10/2010 |
|---|---|---|
| CN | 101988156 A | 3/2011 |

(Continued)

OTHER PUBLICATIONS

International Search Report and Written Opinion in PCT/CN2021/110302 dated Aug. 25, 2020.
(Continued)

*Primary Examiner* — Steven J Bos
(74) *Attorney, Agent, or Firm* — Buchalter; Jason W. Croft

(57) ABSTRACT

The present invention relates to a method for recycling iron and aluminum in a nickel-cobalt-manganese solution. The method comprises the following steps: leaching a battery powder and removing copper therefrom to obtain a copper-removed solution, and adjusting the pH value in stages to remove iron and aluminum, so as to obtain a goethite slag and an iron-aluminum slag separately; mixing the iron-
(Continued)

aluminum slag with an alkali liquor, and heating and stirring same to obtain an aluminum-containing solution and alkaline slag; and heating and stirring the aluminum-containing solution, introducing carbon dioxide thereto and controlling the pH value to obtain aluminum hydroxide and an aluminum-removed solution.

7 Claims, 1 Drawing Sheet

(51) Int. Cl.
  *C01F 7/34* (2006.01)
  *C22B 21/00* (2006.01)
  *C22B 7/00* (2006.01)
  *H01M 10/54* (2006.01)

(58) Field of Classification Search
  USPC .......................................................... 423/124
  See application file for complete search history.

(56) References Cited

FOREIGN PATENT DOCUMENTS

| | | |
|---|---|---|
| CN | 102492858 A | 6/2012 |
| CN | 102515279 A | 6/2012 |
| CN | 104556175 A | 4/2015 |
| CN | 107871912 A | 4/2018 |
| CN | 109439907 A | 3/2019 |
| CN | 110983045 A | 4/2020 |
| CN | 111082043 A | 4/2020 |
| CN | 111304441 A | 6/2020 |
| CN | 112126783 A | 12/2020 |
| CN | 112126783 B | 6/2022 |
| HU | 215754 B | 1/1999 |
| JP | 2005197149 A | 7/2005 |
| WO | 2017159743 A1 | 9/2017 |
| WO | 2017159745 A1 | 9/2017 |
| WO | WO 2018/223193 * 12/2018 |
| WO | 2022042228 A1 | 3/2022 |

OTHER PUBLICATIONS

Notification to Grant Patent Right for Invention in Chinese Patent Application CN202010861358.9 dated Mar. 30, 2022.
First Office Action in Chinese Patent Application CN202010861358.9 dated Nov. 3, 2021.
Office Action in Hungary Application No. P2200168 dated Sep. 26, 2022.
Search Report in Hungary Application No. P2200168 dated Jun. 15, 2022.

* cited by examiner

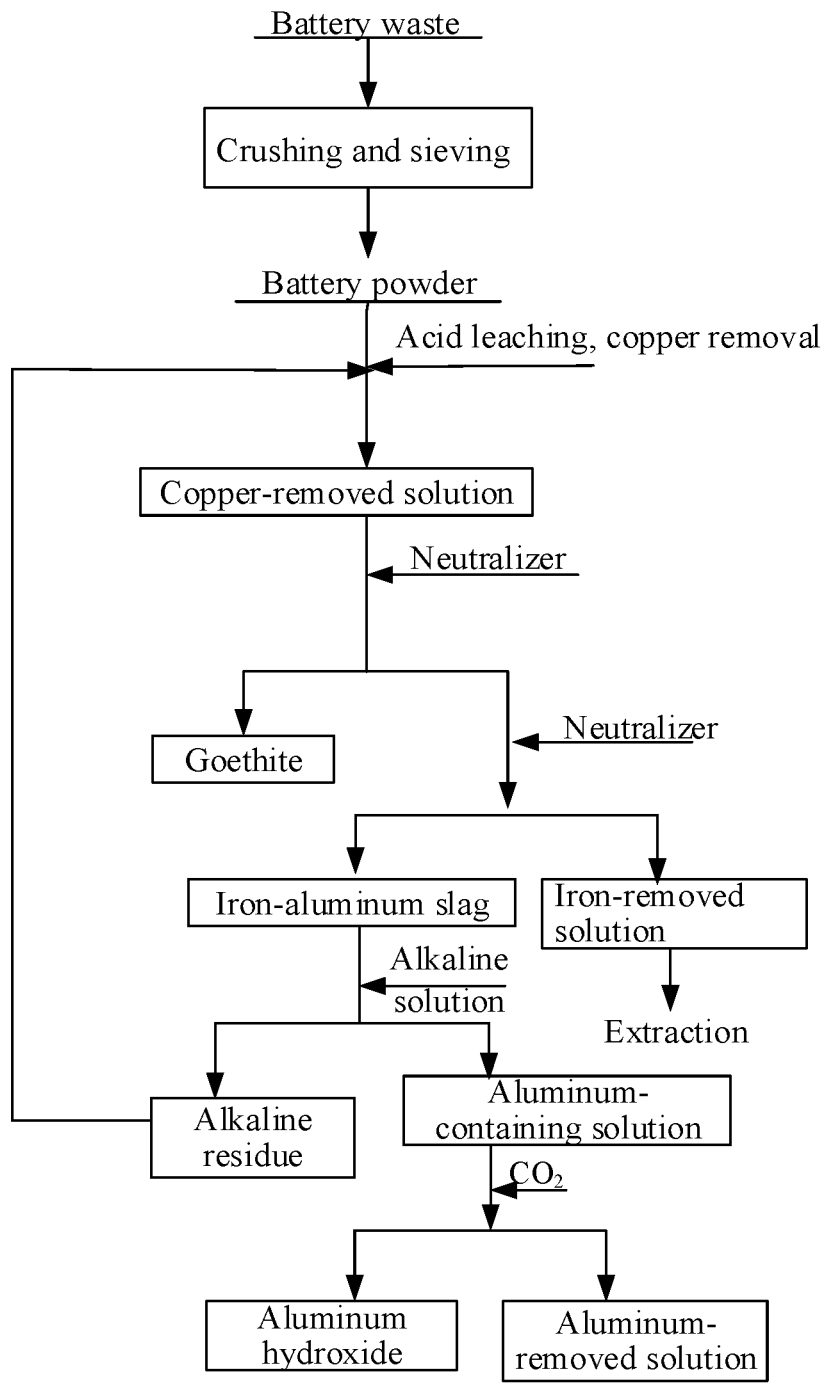

METHOD FOR RECYCLING IRON AND ALUMINUM IN NICKEL-COBALT-MANGANESE SOLUTION

CROSS-REFERENCE TO RELATED APPLICATION

This application is a national stage filing under 35 U.S.C. § 371 of international application number PCT/CN2021/110302, filed Aug. 3, 2021, which claims priority to Chinese patent application No. 202010861358.9, filed Aug. 25, 2020. The contents of these applications are incorporated herein by reference in their entirety.

TECHNICAL FIELD

The present invention relates to the field of spent battery recovery technologies, and specifically, to a method for recycling iron and aluminum during nickel-cobalt-manganese solution recovery.

BACKGROUND

Lithium-ion batteries have been widely used in various industries such as electronic products and electric vehicles; as a production amount and a usage amount of lithium-ion batteries increase significantly, in a few years, there will be a large quantity of lithium-ion batteries that need a waste recovery treatment. If the lithium-ion batteries are not treated properly, environmental pollution and resource waste may be caused; therefore, recovery of lithium-ion batteries is imminent and greatly significant, and is not only beneficial to being environmentally friendly, but also beneficial to resource recycling.

Iron and aluminum are main impurities during the recovery of positive electrode materials from spent lithium-ion batteries, and both the removal and recovery of the impurities get extensive discussions and in-depth researches from scholars. In a hydrometallurgical process of recovering spent batteries, a nickel-cobalt-manganese solution contains a large amount of iron and aluminum; and separating and recovering this part of iron and aluminum will be of a large significance. In hydrometallurgical processes of nickel-cobalt-manganese hydrometallurgy, the following procedures are widely used: acid leaching of raw materials, impurity removal, and extraction and separation; and in the impurity removal procedure, the most important work is to remove iron and aluminum impurities. In industry, a pH value is adjusted to 2-5 usually in a manner of adding sodium hydroxide or sodium carbonate, to precipitate iron in a solution in a form of sodium jarosite or ferric hydroxide, and to precipitate aluminum in a form of aluminum hydroxide. The generated slag is filtered and washed into an iron-aluminum slag that needs to be scrapped. Such an iron-aluminum slag has a very low economic value due to impure components thereof, contains a specific amount of nickel, cobalt, and manganese hydroxides, and is hazardous waste. An ordinary landfill treatment not only causes severe harm to the environment, but also causes loss of high-value nickel, cobalt, and manganese resources.

SUMMARY

In view of this, an objective of embodiments of the present invention is to provide a method for recycling iron and aluminum from a nickel-cobalt-manganese solution. In the method according to the embodiments of the present invention, iron and aluminum can be effectively removed from a solution, and in addition, iron and aluminum are recycled, so that a resource recycling rate can be effectively increased, a process is appropriate, costs are relatively low, environmental pollution is low, and produced by-products can be returned to a hydrometallurgical system. In the process system of the present invention, no excess hazardous slag is discharged, leading to good economic and social benefits.

The objective of the present invention is achieved through the following technical methods:

A method for recycling iron and aluminum from a nickel-cobalt-manganese solution is provided, including the following steps:

performing leaching and copper removal on a battery powder to obtain a copper-removed solution, and removing iron and aluminum by adjusting a pH value in stages to obtain a goethite slag and an iron-aluminum slag respectively;

mixing the iron-aluminum slag with an alkaline solution, and heating and stirring, to obtain an aluminum-containing solution and an alkaline residue; and heating and stirring the aluminum-containing solution, introducing carbon dioxide, and controlling the pH value, to obtain aluminum hydroxide and an aluminum-removed solution.

According to an embodiment of the present invention, the battery powder may be obtained by crushing battery waste. According to an embodiment of the present invention, the battery waste may be selected from waste positive electrode materials obtained by disassembling spent lithium batteries or waste positive electrode materials produced during lithium battery manufacturing. In some embodiments, after leaching and copper removal are performed on the battery powder, a copper-removed solution containing nickel, cobalt, manganese, iron, and aluminum is obtained.

According to an embodiment of the present invention, the removing iron and aluminum by adjusting a pH value in stages includes:

adding a neutralizer, controlling the pH value to 2-4, and heating for a reaction, to obtain the goethite slag; and adding a neutralizer, adjusting the pH value to 4-5, and heating for a reaction, to obtain the iron-aluminum slag and an iron-removed solution.

According to an embodiment of the present invention, the goethite slag is washed and dried to obtain a goethite product. In this embodiment of the present invention, the neutralizer includes, but is not limited to, one or more of sodium carbonate, potassium carbonate, calcium carbonate, calcium hydroxide, or magnesium hydroxide. In some embodiments, after the goethite slag is washed and dried, purity of the obtained goethite product reaches 90% or higher.

According to some specific embodiments of the present invention, the pH value is controlled to 2-4, a reaction temperature is 70-95° C., a reaction time is 1-4 h, the reaction is ended when the pH value is stable, and the goethite slag is obtained, thereby avoiding accumulation of an excess slag. In some specific embodiments of the present invention, the pH value is adjusted to 4-5, a reaction temperature is 60-95° C., a reaction time is 2-4 h, and the iron-aluminum slag and the iron-removed solution are obtained.

According to an embodiment of the present invention, the method further includes: extracting the obtained iron-removed solution to obtain a nickel-cobalt-manganese product.

According to an embodiment of the present invention, the alkaline solution is a solution including at least one of sodium hydroxide or potassium hydroxide. Preferably, the alkaline solution is a solution having a concentration of 10-30%. In some embodiments, the iron-aluminum slag and the alkaline solution are mixed at a caustic ratio of 2.5-7.5. In some specific embodiments, the iron-aluminum slag and the alkaline solution are mixed, are heated to a temperature of 70-95° C., and at a stirring speed of 200-700 r/min, are stirred and react for 1-5 h.

A sodium metaaluminate solution is generated from the aluminum slag in the iron-aluminum slag in a manner of alkaline leaching, and nickel, cobalt, manganese, and iron in the iron-aluminum slag are concentrated and retained in the alkaline residue, so that the two parts are separated. In some embodiments, nickel, cobalt, manganese, and iron in the obtained aluminum-containing solution are less than 3.0 mg/L, and a content of nickel, cobalt, manganese, and iron in the obtained alkaline residue may reach approximately 20%. According to an embodiment of the present invention, after the aluminum-containing solution and the alkaline residue are obtained, the method further includes: returning the alkaline residue to the acid leaching procedure.

According to an embodiment of the present invention, the aluminum-containing solution is heated and stirred, and then, carbon dioxide is introduced, where a rate of introducing carbon dioxide is 2-8 L/min. According to the embodiments of the present invention, carbon dioxide is introduced, the pH value is controlled to 9.5-11.5, the reaction is ended when the pH value is stable, and the aluminum hydroxide and the aluminum-removed solution are obtained. In some embodiments, the aluminum-containing solution is heated and stirred at a stirring speed of 200-500 r/min and a reaction temperature of 30-90° C. In an embodiment of the present invention, aluminum hydroxide is prepared from the sodium metaaluminate solution through carbonation for recovery of aluminum therein. In some embodiments, purity of the obtained aluminum hydroxide may be 95-97%. The aluminum-removed solution is rich in by-products such as sodium carbonate and sodium bicarbonate. The aluminum-removed solution may be used as a neutralizer and returned to the system for removing iron and aluminum in stages. According to an embodiment of the present invention, after the aluminum hydroxide and the aluminum-removed solution are obtained, the method further includes: using the aluminum-removed solution to adjust the pH value of the solution.

The method in the embodiments of the present invention has the following advantages and effects:

In the embodiments of the present invention, an iron-aluminum slag that is hazardous solid waste is creatively recycled, not only high-value nickel, cobalt, and manganese metals that are hazardous to the environment are recovered, but also high-quality goethite is produced, where purity of the obtained goethite product reaches 90% or higher. In addition, aluminum therein is used for producing an aluminum hydroxide product having an economic value. The process of the embodiments of the present invention is simple and feasible, and nickel, cobalt, manganese, iron, and aluminum can be separated in one step, and therefore, are recycled separately. The aluminum-removed solution obtained in the process may be reused in the system as a neutralizer. In the process of the embodiments of the present invention, no liquid or solid waste is generated.

BRIEF DESCRIPTION OF THE DRAWINGS

FIG. 1 is a flowchart of a method for recycling an aluminum slag from a nickel-cobalt-manganese solution according to an embodiment of the present invention.

DETAILED DESCRIPTION OF EMBODIMENTS

The present invention is further described below in detail with reference to embodiments, but implementations of the present invention are not limited thereto.

Referring to FIG. 1, specifically, a method for recycling an aluminum slag from a nickel-cobalt-manganese solution is provided, including the following steps:

(1) crushing and sieving battery waste to obtain a battery powder;

(2) acid-leaching the obtained battery powder to obtain a leachate, adding an iron powder for copper removal to obtain a copper-removed solution, adding a neutralizer to control a pH value to 2-4, where a reaction temperature is 70-95° C. and a reaction time is 1-4 h, and ending a reaction when the pH value is stable, to obtain a goethite slag; and adding a neutralizer to adjust the pH value to 4-5, where a reaction temperature is 60-95° C., and a reaction time of 2-4 h, to obtain an iron-aluminum slag and an iron-removed solution;

(3) washing and drying the goethite slag to obtain a goethite product;

(4) performing subsequent extraction on the obtained iron-removed solution to obtain a nickel-cobalt-manganese product;

(5) mixing the iron-aluminum slag with an alkaline solution at a caustic ratio of 2.5-7.5, heating to a temperature of 70-150° C. for a reaction for 1-5 h at a stirring speed of 200-700 r/min, to obtain an aluminum-containing solution and an alkaline residue; and returning the alkaline residue to the acid leaching procedure; and (6) stirring the aluminum-containing solution at 30-90° C. and a stirring speed of 200-500 r/min, and introducing carbon dioxide at 2-8 L/min, where the pH value at the end of the reaction is 9.5-11.5, to obtain aluminum hydroxide and an aluminum-removed solution; and using the aluminum-removed solution to adjust the pH value of the solution.

In this embodiment of the present invention, the spent battery powder, as a raw material, is acid-leached to obtain the nickel-cobalt-manganese solution containing copper, iron, and aluminum. Copper in the solution is recovered after being replaced by an iron powder, and then, a neutralizer is added to remove iron and aluminum from the solution, to obtain a qualified nickel-cobalt-manganese solution. However, iron and aluminum in the iron-aluminum slag generated in an impurity removal reaction have low grades, and cannot be directly recovered. Moreover, the iron-aluminum slag contains a specific amount of nickel, cobalt, and manganese that need to be separated from iron and aluminum for recovery. A sodium metaaluminate solution is generated from the aluminum slag in the iron-aluminum slag in a manner of alkaline leaching, and nickel, cobalt, manganese, and iron in the iron-aluminum slag are concentrated and retained in the alkaline residue, so that the two parts are separated. Aluminum hydroxide is prepared from the sodium metaaluminate solution through carbonation for recovery of aluminum therein. In addition, the aluminum-removed solution rich in by-products, such as sodium carbonate, is obtained. An alkaline residue rich in nickel, cobalt, manganese, and iron is returned to the process for recovery of nickel, cobalt, and manganese therein. In the alkaline residue treatment process in this embodiment of the present invention, an original hazardous iron-aluminum slag can be recycled into a usable aluminum hydroxide product, a sodium carbonate solution, and goethite having an economic value.

The present invention is further described below in detail with reference to embodiments to help a person skilled in the art to understand the present invention. It is necessary to specifically note that the embodiments are only used to further illustrate the present invention and cannot be understood as limitations to the protection scope of the present invention. Inessential improvements and adjustments made by a person skilled in the art to the present invention based on the foregoing summary of the invention should still fall within the protection scope of the present invention. In addition, the raw materials that are mentioned below and that are not specified in detail are all commercially available products. Concentrations of metal ions in the following embodiments are all measured through atomic absorption spectroscopy (AAS) or inductively coupled plasma atomic emission spectroscopy (ICP-AES). A concentration of fluoride ion is measured through fluoride electrode potentiometry. The process steps or preparation methods not mentioned in detail are process steps or preparation methods known to a person skilled in the art.

Embodiment 1

This embodiment provided a method for recycling an aluminum slag from a nickel-cobalt-manganese solution including the following steps:

(1) Lithium-ion battery waste was crushed and sieved to obtain a battery powder.

(2) The battery powder was leached by using sulfuric acid to obtain a nickel-cobalt-manganese solution containing copper and aluminum, where a total concentration of nickel, cobalt and manganese was 110 g/L, and a concentration of aluminum was 6.2 g/L; an iron powder was added to the solution for copper removal to obtain a copper-removed solution, where a concentration of iron in the copper-removed solution was 4.5 g/L; sodium carbonate was added to the copper-removed solution at 90° C. to control a pH value at the end of the reaction to 3.0, and a goethite slag was obtained after the reaction was performed for 2 h, and was washed and dried to obtain a goethite product having purity of 90% and an iron content of 55.4%; sodium carbonate was then added at 90° C. to adjust the pH value of the solution to 4.5-5.0, to obtain an iron-aluminum slag and an iron-removed solution, where in the iron-aluminum slag, the iron content was 5.0%, and an aluminum content was 15.6%; and subsequent extraction was performed on the obtained iron-removed solution to obtain a nickel-cobalt-manganese product. The contents of nickel, cobalt, manganese, iron, and aluminum in goethite and the goethite-removed solution were shown in Table 1. The contents of nickel, cobalt, manganese, iron, and aluminum in the iron-aluminum slag and the iron-removed solution were shown in Table 2.

TABLE 1

Contents of nickel, cobalt, manganese, iron, and aluminum in goethite and goethite-removed solution

| Sample | Nickel | Cobalt | Manganese | Iron | Aluminum |
| --- | --- | --- | --- | --- | --- |
| Goethite | 1.7% | 0.7% | 0.5% | 55.4% | 2.1% |
| Goethite-removed solution | 46.27 g/L | 19.27 g/L | 9.11 g/L | 2.37 g/L | 6.09 g/L |

TABLE 2

Contents of nickel, cobalt, manganese, iron, and aluminum in the iron-aluminum slag and the iron-removed solution

| Sample | Nickel | Cobalt | Manganese | Iron | Aluminum |
| --- | --- | --- | --- | --- | --- |
| Iron-aluminum slag | 2.4% | 1.2% | 0.7% | 5.0% | 15.6% |
| Iron-removed solution | 42.18 g/L | 16.57 g/L | 8.24 g/L | 0.09 g/L | 0.007 g/L |

(3) 30% sodium hydroxide solution was added to 100 g of the obtained iron-aluminum slag at a caustic ratio of 5.0 for reaction at a constant temperature of 90° C. and a stirring speed of 600 r/min for 3 h, and a slurry was filtered while it was hot after the reaction was ended, to obtain a sodium metaaluminate solution and an alkaline residue, where concentrations of nickel, cobalt, manganese, and iron in the sodium metaaluminate solution were respectively 0.002 g/L, 0.001 g/L, 0.0005 g/L, and 0.0001 g/L, and a concentration of aluminum was 34.73 g/L; and a total content of nickel, cobalt, manganese, and iron in the alkaline residue was 19.99%, and an aluminum content was 3.97%. The contents of nickel, cobalt, and manganese in the sodium metaaluminate solution and the alkaline residue were shown in Table 3.

TABLE 3

Contents of nickel, cobalt, and manganese in the sodium metaaluminate solution and the alkaline residue

| Sample | Nickel | Cobalt | Manganese | Iron | Aluminum |
| --- | --- | --- | --- | --- | --- |
| Sodium metaaluminate solution | 0.002 g/L | 0.001 g/L | 0.0005 g/L | 0.0001 g/L | 34.73 g/L |
| Alkaline residue | 6.84% | 3.46% | 2.19% | 7.5% | 3.97% |

(4) The alkaline residue obtained in step (3) was returned to the acid leaching procedure; carbon dioxide was introduced into the obtained sodium metaaluminate solution at a rate of 5 L/min, where the reaction temperature was controlled to 30° C., the stirring speed was controlled to 300 r/min, and the pH value at the end of the reaction was controlled to 10.0, the slurry was filtered after the reaction was ended, where a filtrate was a sodium carbonate-containing solution, and an aluminum content was 1.6 mg/L, and the obtained sodium carbonate-containing solution was used as a neutralizer in step (2) for controlling or adjusting the pH value; and a filter residue was washed to obtain an aluminum hydroxide product, where purity of the aluminum hydroxide was measured to be 96.1%. The contents of nickel, cobalt, and manganese in the sodium carbonate-containing solution and the filter residue were shown in Table 4.

TABLE 4

Contents of nickel, cobalt, and manganese in the sodium
carbonate-containing solution and the filter residue

| Sample | Nickel | Cobalt | Manganese | Iron | Aluminum |
|---|---|---|---|---|---|
| Sodium carbonate-containing solution | 0.001 g/L | 0.0005 g/L | 0.001 g/L | 0.0002 g/L | 0.0016 g/L |
| Filter residue | <0.005% | <0.005% | <0.005% | <0.005% | 33% |

Embodiment 2

This embodiment provided a method for recycling an aluminum slag from a nickel-cobalt-manganese solution including the following steps:

(1) Lithium-ion battery waste was crushed and sieved to obtain a battery powder.

(2) The battery powder was leached by using sulfuric acid to obtain a nickel-cobalt-manganese solution containing copper and aluminum, where a total concentration of nickel, cobalt and manganese was 115 g/L, and a concentration of aluminum was 8.3 g/L; an iron powder was added to the solution for copper removal to obtain a copper-removed solution, where a concentration of iron in the copper-removed solution was 4.2 g/L; calcium hydroxide was added to the copper-removed solution at 95° C. to control a pH value at the end of the reaction to 3.5, and a goethite slag was obtained after the reaction was performed for 3 h, and was washed and dried to obtain a goethite product having purity of 92% and an iron content of 56.4%; calcium hydroxide was then added at 85° C. to adjust the pH value of the solution to 4.0-4.5, to obtain an iron-aluminum slag and an iron-removed solution, where in the iron-aluminum slag, the iron content was 4.0%, and an aluminum content was 17.2%; and subsequent extraction was performed on the iron-removed solution to obtain a nickel-cobalt-manganese product. The contents of nickel, cobalt, manganese, iron, and aluminum in goethite and the goethite-removed solution were shown in Table 5. The contents of nickel, cobalt, manganese, iron, and aluminum in the iron-aluminum slag and the iron-removed solution were shown in Table 6.

TABLE 6

Contents of nickel, cobalt, manganese, iron, and aluminum
in the iron-aluminum slag and the iron-removed solution

| Sample | Nickel | Cobalt | Manganese | Iron | Aluminum |
|---|---|---|---|---|---|
| Iron-aluminum slag | 3.7% | 2.2% | 0.7% | 4.0% | 17.2% |
| Iron-removed solution | 45.19 g/L | 19.81 g/L | 15.19 g/L | 0.04 g/L | 0.008 g/L |

(3) 20% sodium hydroxide solution was added to 100 g of the obtained iron-aluminum slag at a caustic ratio of 6.0 for reaction at a constant temperature of 100° C. and a stirring speed of 500 r/min for 5 h, and a slurry was filtered while it was hot after the reaction was ended, to obtain a sodium metaaluminate solution and an alkaline residue, where concentrations of nickel, cobalt, manganese, and iron in the sodium metaaluminate solution were respectively 0.001 g/L, 0.005 g/L, 0.001 g/L, and 0.0002 g/L, and a concentration of aluminum was 32.78 g/L; and a total content of nickel, cobalt, manganese, and iron in the alkaline residue was 17.42%, and an aluminum content was 4.27%. The contents of nickel, cobalt, and manganese in the sodium metaaluminate solution and the alkaline residue were shown in Table 7.

TABLE 7

Contents of nickel, cobalt, and manganese in the sodium
metaaluminate solution and the alkaline residue

| Sample | Nickel | Cobalt | Manganese | Iron | Aluminum |
|---|---|---|---|---|---|
| Sodium metaaluminate solution | 0.001 g/L | 0.005 g/L | 0.001 g/L | 0.0002 g/L | 32.78 g/L |
| Alkaline residue | 6.84% | 3.46% | 1.92% | 5.2% | 4.27% |

TABLE 5

Contents of nickel, cobalt, manganese, iron, and aluminum
in goethite and goethite-removed solution

| Sample | Nickel | Cobalt | Manganese | Iron | Aluminum |
|---|---|---|---|---|---|
| Goethite | 1.9% | 1.0% | 0.8% | 56.4% | 3.1% |
| Goethite-removed solution | 48.18 g/L | 22.27 g/L | 16.21 g/L | 1.97 g/L | 7.91 g/L |

(4) The alkaline residue obtained in step (3) was returned to the acid leaching procedure; carbon dioxide was introduced into the obtained sodium metaaluminate solution at a rate of 6 L/min, where the reaction temperature was controlled to 50° C., the stirring speed was controlled to 400 r/min, and the pH value at the end of the reaction was controlled to 10.5, the slurry was filtered after the reaction was ended, where a filtrate was a sodium carbonate-containing solution, and an aluminum content was 1.0 mg/L, and the obtained sodium carbonate-containing solution may be used as a neutralizer in step (2) for controlling or adjusting the pH value; and a filter residue was washed to obtain an aluminum hydroxide product, where purity of the aluminum hydroxide was measured to be 95.7%. The contents of nickel, cobalt, and manganese in the sodium carbonate-containing solution and the filter residue were shown in Table 8.

TABLE 8

Contents of nickel, cobalt, and manganese in the sodium carbonate-containing solution and the filter residue

| Sample | Nickel | Cobalt | Manganese | Iron | Aluminum |
|---|---|---|---|---|---|
| Sodium carbonate-containing solution | 0.002 g/L | 0.001 g/L | 0.0005 g/L | 0.0001 g/L | 0.001 g/L |
| Filter residue | <0.005% | <0.005% | <0.005% | <0.005% | 33.11% |

Embodiment 3

This embodiment provided a method for recycling an aluminum slag from a nickel-cobalt-manganese solution including the following steps:

(1) Lithium-ion battery waste was crushed and sieved to obtain a battery powder.

(2) The battery powder was leached by using sulfuric acid to obtain a nickel-cobalt-manganese solution containing copper and aluminum, where a total concentration of nickel, cobalt and manganese was 95 g/L, and a concentration of aluminum was 6.7 g/L; an iron powder was added to the solution for copper removal to obtain a copper-removed solution, where a concentration of iron in the copper-removed solution was 4.8 g/L; sodium carbonate was added to the copper-removed solution at 85° C. to control a pH value at the end of the reaction to 2.8, and a goethite slag was obtained after the reaction was performed for 1.5 h, and was washed and dried to obtain a goethite product having purity of 93% and an iron content of 58.47%; sodium carbonate was then added at 85° C. to adjust the pH value of the solution to 4.5-4.8, to obtain an iron-aluminum slag and an iron-removed solution, where in the iron-aluminum slag, the iron content was 6.8%, and an aluminum content was 12.6%; and subsequent extraction was performed on the iron-removed solution to obtain a nickel-cobalt-manganese product. The contents of nickel, cobalt, manganese, iron, and aluminum in goethite and the goethite-removed solution were shown in Table 9. The contents of nickel, cobalt, manganese, iron, and aluminum in the iron-aluminum slag and the iron-removed solution were shown in Table 10.

TABLE 9

Contents of nickel, cobalt, manganese, iron, and aluminum in goethite and goethite-removed solution

| Sample | Nickel | Cobalt | Manganese | Iron | Aluminum |
|---|---|---|---|---|---|
| Goethite | 2.4% | 1.5% | 0.7% | 58.47% | 1.9% |
| Goethite-removed solution | 41.74 g/L | 17.81 g/L | 10.92 g/L | 1.82 g/L | 6.38 g/L |

TABLE 10

Contents of nickel, cobalt, manganese, iron, and aluminum in the iron-aluminum slag and the iron-removed solution

| Sample | Nickel | Cobalt | Manganese | Iron | Aluminum |
|---|---|---|---|---|---|
| Iron-aluminum slag | 2.7% | 1.6% | 0.6% | 6.8% | 12.6% |
| Iron-removed solution | 37.18 g/L | 16.57 g/L | 8.24 g/L | 0.09 g/L | 0.007 g/L |

(3) 30% sodium hydroxide solution was added to 100 g of the obtained iron-aluminum slag at a caustic ratio of 7.0 for reaction at a constant temperature of 110° C. and a stirring speed of 700 r/min for 5 h, and a slurry was filtered while it was hot after the reaction was ended, to obtain a sodium metaaluminate solution and an alkaline residue, where concentrations of nickel, cobalt, manganese, and iron in the sodium metaaluminate solution were respectively 0.002 g/L, 0.003 g/L, 0.0006 g/L, and 0.0005 g/L, and a concentration of aluminum was 27.35 g/L; and a total content of nickel, cobalt, manganese, and iron in the alkaline residue was 19.86%, and an aluminum content was 4.15%. The contents of nickel, cobalt, and manganese in the sodium metaaluminate solution and the alkaline residue were shown in Table 11.

TABLE 11

Contents of nickel, cobalt, and manganese in the sodium metaaluminate solution and the alkaline residue

| Sample | Nickel | Cobalt | Manganese | Iron | Aluminum |
|---|---|---|---|---|---|
| Sodium metaaluminate solution | 0.002 g/L | 0.003 g/L | 0.0006 g/L | 0.001 g/L | 27.35 g/L |
| Alkaline residue | 5.81% | 4.82% | 3.36% | 5.87% | 4.15% |

(4) The alkaline residue obtained in step (3) was returned to the acid leaching procedure; carbon dioxide was introduced into the obtained sodium metaaluminate solution at a rate of 4 L/min, where the reaction temperature was controlled to 70° C., the stirring speed was controlled to 350 r/min, and the pH value at the end of the reaction was controlled to 10.8, the slurry was filtered after the reaction was ended, where a filtrate was a sodium carbonate-containing solution, and an aluminum content was 0.5 mg/L, and the obtained sodium carbonate-containing solution was used as a neutralizer in step (2) for controlling or adjusting the pH value; and a filter residue was washed to obtain an aluminum hydroxide product, where purity of the aluminum hydroxide was measured to be 97.2%. The contents of nickel, cobalt, and manganese in the sodium carbonate-containing solution and the filter residue were shown in Table 12.

TABLE 12

Contents of nickel, cobalt, and manganese in the sodium carbonate-containing solution and the alkaline residue

| Sample | Nickel | Cobalt | Manganese | Iron | Aluminum |
| --- | --- | --- | --- | --- | --- |
| Sodium carbonate-containing solution | 0.002 g/L | 0.001 g/L | 0.0005 g/L | 0.0001 g/L | 0.0005 g/L |
| Filter residue | <0.005% | <0.005% | <0.005% | <0.005% | 33.64% |

Compared with the related art, in the method of the embodiments of the present invention, the original hazardous solid iron-aluminum slag is recycled, not only the high-value nickel, cobalt, and manganese metals that are hazardous to the environment are recovered, but also high-quality goethite is produced, where purity of the obtained goethite product reaches 90% or more, and the goethite can be sold as a commodity. In addition, aluminum therein is used for producing aluminum hydroxide having an economic value, where purity of the obtained aluminum hydroxide reaches 95-97%. The process of the embodiments of the present invention is simple and feasible, and nickel, cobalt, manganese, iron, and aluminum can be separated in one step, and therefore, are recycled separately. A solution obtained after aluminum hydroxide in the process is a sodium carbonate-containing solution, and can be reused in the process. In the process of the embodiments of the present invention, no liquid or solid waste is generated.

The above embodiments are preferred implementations of the present invention. However, the implementation of the present invention is not limited by the above embodiments, and any alternation, modification, substitution, combination, and simplification without departing from the spiritual essence and principles of the present invention should all be equivalent replacements, and all fall within the scope of protection of the present invention.

The invention claimed is:

1. A method for recycling iron and aluminum from a nickel-cobalt-manganese solution, comprising the following steps:

performing leaching and copper removal on a battery powder to obtain a copper-removed solution, and removing iron and aluminum by adjusting a pH value in stages to obtain a goethite slag and an iron-aluminum slag respectively; wherein the removing iron and aluminum by adjusting a pH value in stages comprises: adding a neutralizer, controlling the pH value to 2-4, and heating for a reaction, to obtain the goethite slag; and adding a neutralizer, adjusting the pH value to 4-5, and heating for a reaction, to obtain the iron-aluminum slag and an iron-removed solution; wherein the goethite slag is washed and dried to obtain a goethite product;

mixing the iron-aluminum slag with an alkaline solution, and heating and stirring, to obtain an aluminum-containing solution and an alkaline residue; and heating and stirring the aluminum-containing solution, introducing carbon dioxide, and controlling the pH value to 9.5-11.5, ending the reaction when the pH value is stable, to obtain aluminum hydroxide and an aluminum-removed solution;

wherein after the aluminum-containing solution and the alkaline residue are obtained, the method further comprises: returning the alkaline residue to an acid leaching procedure; and the aluminum-removed solution is used as the neutralizer and returned to a system for removing iron and aluminum in stages.

2. The method according to claim 1, wherein the neutralizer comprises one or more of sodium carbonate, potassium carbonate, calcium carbonate, calcium hydroxide, or magnesium hydroxide.

3. The method according to claim 1, wherein the pH value is controlled to 2-4, a reaction temperature is 70-95° C., a reaction time is 1-4 h, the reaction is ended when the pH value is stable, and the goethite slag is obtained.

4. The method according to claim 1, wherein the pH value is adjusted to 4-5, a reaction temperature is 60-95° C., a reaction time is 2-4 h, and the iron-aluminum slag and the iron-removed solution are obtained.

5. The method according to claim 1, wherein the alkaline solution is a solution comprising at least one of sodium hydroxide or potassium hydroxide.

6. The method according to claim 1, wherein the iron-aluminum slag and the alkaline solution are mixed at a caustic ratio of 2.5-7.5.

7. The method according to claim 1, wherein a rate of introducing carbon dioxide is 2-8 L/min.

* * * * *